United States Patent Office 3,540,157
Patented Nov. 17, 1970

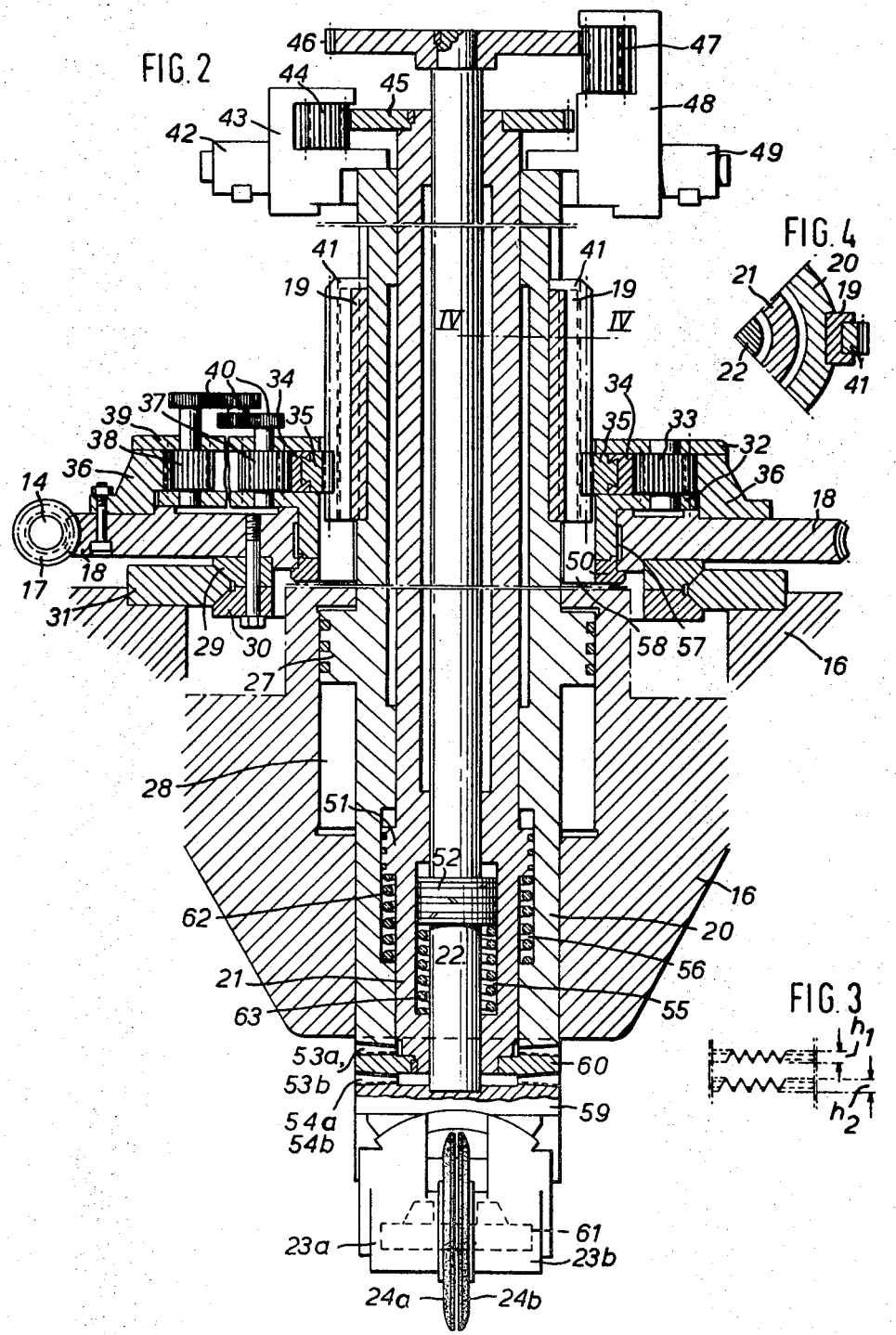

3,540,157
MEANS FOR GENERATING INTERNAL AND EXTERNAL INVOLUTE AND NON-INVOLUTE GEARS
Peter Herbert Cleff, 5 Hartside Place, Melton Park, Gosforth, Newcastle-upon-Tyne, N3 5th, England
Filed Jan. 29, 1968, Ser. No. 701,178
Int. Cl. B24b 5/00, 7/00
U.S. Cl. 51—52
6 Claims

ABSTRACT OF THE DISCLOSURE

A machine tool for grinding precut gear teeth to involute or non-involute form comprises a machine bed with a rotating work table for the gear to be ground and a column slidable and adjustable on the bed and carrying a profiled grinding wheel with means for controlled rotation and reciprocation thereof against the gear teeth.

This invention relates to a machine tool for the finishing of precut involute and non-involute tooth flanks of internal and external spur or helical gears. Even though in what follows reference will mainly be made to grinding as the finishing process, it must be clearly understood that other metal removing processes such as spark-erosion, electro-chemical machining and the like, may readily be adapted to the purposes of this invention.

The main object of the invention is to provide improved means whereby internal and external involute and non-involute gears may be flank-ground whilst being rotated at constant, or near constant, angular velocity. A further object of the invention is to execute the flank-grinding operation by what may be termed the "formed wheel/generative" process and which was, inter alia briefly referred to in my U.S. Pat. No. 3,091,059 of May 28, 1963. Yet a further object of this invention is to provide means whereby the "non-grinding" cycle time which this process of necessity entails, may be reduced to a minimum. Yet another object of the invention is to provide simplified means of helix generation for the grinding of internal and external involute helicoids, by the grinding process referred to, carried out on a gear grinding machine in accordance with the invention.

According to the invention, a machine tool for the flank grinding of the teeth of internal or external, spur or helical, involute and non-involute gears by the "formed wheel/generative" process, comprises: a substantial main machine bed at one end of which is located a power-driven continuously rotating work table, carrying secured thereto the workgear to be ground, and at the other end of which there is mounted a column or stanchion rectilinearly slidable and adjustable thereagainst for correct centre-distance setting between said table and said column; an outrigger slide, slidably adjustable along said column or stanchion in a direction parallel to the axis of rotation of said work table; a first cylindrical ram slide reciprocatably and rotatably supported in said outrigger slide, with a first means for adjustaby reciprocating said first ram slide relative to said outrigger slide, a second adjustable means for simultaneously rotating said first ram slide relative to said outrigger slide and in timed relation with and proportional to the rotation of the rotating work table for the purpose of involute profile generation, and a third selectively adjustable means for superimposing on the aforementioned rotation of said first ram slide a further predetermined additive or subtractive rotation in timed relation with and proportional to the reciprocation of said first ram slide relative to said outrigger slide and due to the said first means, for the generative finishing of involute and non-involue helicoids; a second generally cylindrical ram slide reciprocatably and rotatably journalled within the first ram slide, means for reciprocating and rotating said second ram slide relative to said first ram slide in accordance with a first selectively predetermined program, and further means for drive-connecting rotationally in a program-determined relative angular position one to the other said second ram slide to said first ram slide; a third generally cylindrical ram slide reciprocatably and rotatably housed within the said second ram slide, means for reciprocating and rotating said third ram slide relative to said second and/or said first ram slide in accordance with a second predetermined program, and further means for drive-connecting rotationally in a program-determined relative angular position one to the other said third ram slide to said second ram slide; means for correlating said first predetermined program and said second predetermined program; and a grinding head unit mounted at the lower end nearest the work table of said third ram slide angularly adjustable thereagainst to any workgear helix angle within the range of the machine, and comprising at least one power-driven grinding spindle, a grinding wheel mounted thereon and rotatable therewith, and suitable means for form-dressing, form-trueing and wear-compensating said grinding wheel in accordance with the workgear specification and the grinding parameters selected.

The invention will now be described, by way of example, in its preferred form with reference to the accompanying drawings, in which:

FIG. 1 is a diagrammatic plan view of a complete gear grinding machine for the flank-grinding of internal and external involute or non-involute gears in accordance with the invention, FIG. 2 is an axial section through the grinding-head-carrying combination of first, second and third ram slides, the reciprocating and rotating program-controlled drives thereto, the helix angle generating unit, and the elements of the "non-grinding" cycle time reduction mechanism.

(Note: The upper third of FIG. 2, between twin chain-dotted lines, is drawn 90 arc-degrees out of true for clarity.)

FIG. 3 is a detail view of the differential coupling means between ram slides,

FIG. 4 is a transverse partial section through the ram slides, channel-shaped drive keys and initiator racks for the helix angle generating unit.

Figure 1:
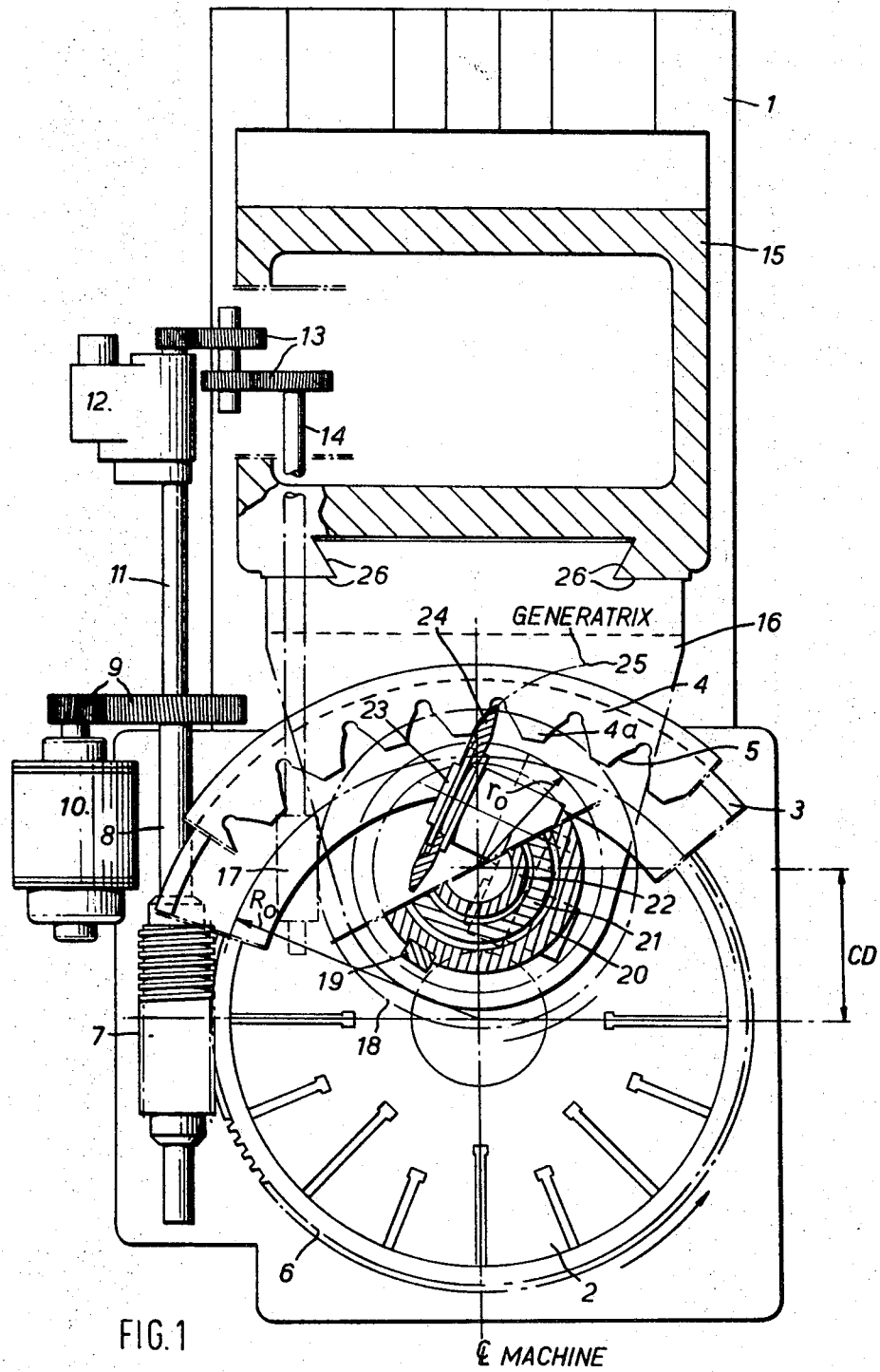

Referring to FIGS. 1 and 2, a substantial main machine bed is indicated at 1. Mounted thereon at one end is a rotatable work table 2 carrying secured thereto by means of a tub 3, an internal workgear 4 with precut teeth 4a having flanks 5. The work table is rotated by a motor 10 driving through a set of speed-change gears 9, worm shaft 11 and master worm 7, a master wormwheel 6 in drive-engagement with said master worm and firmly bolted to table 2.

At the other end of the main machine bed 1 there is mounted a column or stanchion 15, slidably adjustable thereagainst for setting said column to distance CD from the axis of rotation of work table 2. A pair of guide ways 26, forming integral parts of column 15, slidably support an outrigger slide 16 which can thereby be adjustably clamped to said column at any desired height (within, of course, the designed capacity of the machine) above the top surface of work table 2.

Slidably and simultaneously rotatably journalled within said outrigger slide 16 is a first ram slide 20, of generally circular cross-section, which can be made to reciprocate by means of a piston 27 integral with said first ram slide and operating within a cylinder 28 machined into the outrigger slide 16. Time and volume controlled admission of fluid under pressure to first the upper, then the lower working area of piston 27—and so on—will cause the ram slide 20 to reciprocate in a respectively "downward/upward" repetitive cycle.

In order to make any formed involute or non-involute generating tool attached (either directly or indirectly) to the first ram slide generate an involute or non-involute profile on the workgear, be such tool a gear-pinion-like shaper cutter or part of one, or as in this case a formed grinding wheel or a pair of such formed grinding wheels representing respectively one flank or both flanks of one shaper cutter tooth, said ram slide must be given, in addition to its reciprocating motion, a simultaneous continuous rotation round its vertical axis in timed relation to that of the work table such that the ratio of workgear rotation to ram slide rotation is equal to the ratio of number of teeth in the workgear to the number of actual or virtual teeth in the formed generating tool attached to said first ram slide. This necessary rotation of the first ram slide 20 is introduced by means of a master wormwheel 18 in axially slidable rotary drive-connection with said ram slide, said master wormwheel being rotatably journalled in outrigger slide 16 by means of contra-conical journal and thrust bearings rings 29 and 30 bolted to the wormwheel, and a conforming ring 31 bolted to the outrigger slide 16, said wormwheel 18 being driven from the master worm 7 via a shaft 11, a gear differential 12, a set of change gears 13, a line shaft 14, and a master worm 17 in drive-engagement therewith.

As will be readily understood by those skilled in the art, the afore-described arrangement will only allow of the production of either internally or externally toothed spur gears, i.e. gears having the tooth surface generator lines parallel to their axes of rotation. In order to produce helical involute or- non-involute tooth surfaces, called involute or non-involute helicoids respectively, on such internal or external gears, a further rotation, simultaneously either additive to or subtractive from the profile-generative rotation, must be imparted to the first ram slide, and in addition said further rotation must stand in a pre-determined constant ratio to the rectilinear reciprocation of said first ram slide 20.

Thus have been described the two necessary and sufficient conditions which must be complied with if a gear grinding machine in accordance with the invention is to produce both spur and helical, internal and external, involute and non-involute gears.

Means to produce such further rotation are well known. One usual method, for instance, utilises three-dimensional cylinder cams with an appropriate follower or followers. These cams are extremely expensive to produce to the required high degree of accuracy. They are subject to a comparatively high rate of wear on account of the unsatisfactory contact conditions between such cams and their respective follower. Since they cannot be made or operated without backlash, only single stroke working is possible on machines incorporating this device. This method also requires one cam per one helix angle of workgear.

In accordance with the present invention, another method is provided for introducing the further rotation of first ram slide 20 relative to the rotating master wormwheel 18. Interposed between master wormwheel 18 and first ram slide 20 there is a generally circular cage structure 32/39, having an upper and a lower end plate with space therebetween. This cage or carrier is rotatably held within master wormwheel 1, by means of a spigot 57 and a flanged thrust ring 50 bolted thereto, and is slidably drive-connected rotationally to ram slide 20 by two channel-shaped keys 19 firmly bolted to said ram slide in positions 180 arc-degrees apart and engaging corresponding key-ways 58 in cage 32/39. Each key 19 carries within its channel a helical rack 41 adjustably bolted thereto, and having a certain pre-determined helix angle $\sigma_r$, both racks 41 being of the same hand. In drive-mesh with each rack 41 there is another rack 35 rectilinearly guided in cage 32/39 and reciprocating slidably thereagainst in a direction at right angles to the axis of reciprocation of the first ram slide 20. Thus, if cage 32/39 be held stationary and first ram slide 20 be reciprocated thereagainst, racks 35 will also be moving reciprocatingly relative to the cage, the ratio between these two linear movements being uniquely determined by the helix angle $\sigma_r$ of the inter-meshing racks 41 and 35. To convert now the rectilinear motion of racks 35 relative to cage 32/39 into an additional and positively or negatively proportional rotation of said cage and of said first ram slide slidable keyed thereto, against master wormwheel 18, each rack 35 has attached thereto another rack 34 with a small amount of linear adjustment of rack 34 against rack 35 in each pair.

Referring first now to the right-hand half of FIG. 2, it will be seen that rack 34 is in geared mesh with a pinion 33 journalled in cage 32, and that said pinion 33 is in sumultaneous geared mesh with an internally toothed gear ring 36 bolted firmly to master wormwheel 18 and coaxial therewith.

The resulting operational sequence upon reciprocating first ram slide 20 relative to a stationary, or rotating, master wormwheel 18 is readily visualised. Rack 41 reciprocates racks 35 and 34, rack 34 rotates pinion 33 relative to cage 32 and pinion 33 drives against internal ring gear 36. Since pinion 33 cannot rotate internal ring gear 36 cum master wormwheel 18 against master worm 17 which is self-locking, it rotates instead in a planetary fashion the cage 32 and with it reciprocating ram slide 20 by means of keys 19 in the required manner. Although not shown, there may be two identical mechanisms of the form just described in 180 arc-degrees juxtaposition. By moving racks 35 and 34 rectilinearly relative to one another and then bolting them firmly together so that they become as one, any backlash can be completely eliminated and the gear grinding machine so equipped can safely be made to grind on both the upward and the downward stroke of ram slide 20.

The advantages of the proposed arrangement will be obvious to those skilled in the art. Simple, straight-flank racks which can be made cheaply and very accurately, are used as "motion initiators." They may be hardened and ground with equal facility. Because of area contact between rack pairs 41/35 specific operational loads will be low and hence rack life will be longer than that of a corresponding cylinder cam and follower. The rack intermesh may be made adjustable without difficulty. All other components of the helix angle generating mechanism are simple and can easily be manufactured to a high degree of accuracy and they can be made to operate with a minimum in intrinsic errors and a maximum in dynamic stiffness.

One disadvantage still remains, however. A new, different helix angle on the workgear requires two new sets of racks 41/35. To overcome this, at least to some extent, the arrangement shown in the relevant left-hand half of FIG. 2 is provided. Pinion 33 of the right-hand configuration is replaced by a shaft pinion 37 driving through a set of lead-change gears 40 another shaft pinion 38 journalled in cage 39 and driving against the previously mentioned internal ring gear 36 bolted to the master wormwheel 18. This mechanism functions, in the same manner as the one previously described, the only difference being that a twin set of racks 41/35 may now produce a range of helix angles on the workgear commensurate with the possible range of lead-change gears which can be accommodated within the space available. The problem of increased cumulative backlash in the enlarged train is of no importance since, in this arrangement, a doubling of generating/transmission mechanisms in 180 arc-degrees juxtaposition will allow of complete backlash elimination, if not actual pre-loading of one mechanism against its 180 arc-degrees identical counterpart, by relative adjustment of racks 35 against racks 34 in the manner already described. A reduction in transmission stiffness owing to the longer train can be avoided by suitable design of the parts.

Referring now to FIGS. 2, 3 and 4, further aspects of the invention will be described. First ram slide 20 has housed therein, and coaxial therewith, a second ram slide 21, generally circular in shape, fully rotationable and reciprocable with a short-stroke relative to said first ram slide 20. Reciprocation is achieved by time/volume controlled admission of fluid under pressure to either the upper or lower free working area of a piston 51 integral with 21 and operating within a cylinder 56 machined into first ram slide 20. Rotation of second ram slide 21 relative to first ram slide 20 is derived from a first actuating unit 43, bolted to first ram slide 20, driven by a program-controlled step motor 42 or the like and driving ram slide 21 though a spur pinion 44 and a spur gear wheel 45 in mesh with said pinion and keyed to said second ram slide 21. Pinion 44 is of such face width as to allow of second ram slide 21 being rotated relative to first ram slide 20 at any axial position of the former relative to the latter anywhere within the stroke range of piston 51.

Within the second ram slide 21 and coaxial therewith, there is provided a third ram slide 22, also generally circular in shape, and also fully rotatable and reciproctable with a short-stroke relative to second ram slide 21 and first ram slide 20. Reciprocation is obtained hydraulically by means of a piston 52 integral with 22 and operating within a cylinder machined into 21, said cylinder being numbered 55, in the manner already described for the reciprocation of ram slide 21 relative to ram slide 20. Rotation of ram slide 22 relative to the ram slides 21 and 20 is obtained from a second actuating unit 48 bolted to first ram slide 20, driven by a program-controlled step motor 49 or the like and driving ram slide 22 through a spur pinion 47 and a spur gear wheel 46 in mesh with said pinion and keyed to said third ram slide 22. Face widths of pinion 47 and gear wheel 46 are again such as to permit of rotation of third ram slide at any stroke position of piston 52.

At the lower end of the third ram slide 22 there is integrally attached to it a generally circular carrier frame 59 which in turn carries, in an angularly adjustable manner for the accommodation of helical workgears 4, a grinding unit as briefly outlined in my United States Pat. No. 3,091,059 but modified to comprise two formed grinding wheels 24a and 24b rotatably mounted on motorised grinding spindles 23a and 23b respectively. Each grinding wheel has dressed upon it an involute generatrix by a combined wheel-dressing and wheel-wear-compensating unit 61 situated in a generally horizontal position on carrier frame 59 and behind the grinding wheels on their disengaged side. This unit 61 operates from an adjustable base circle of radius $r_0$ (see FIG. 1 showing one grinding wheel) and the generatrices dressed on to the grinding wheels 24a and 24b thus form the right-hand and left-hand flank of one tooth of a shaper cutter of base circle radius $r_0$, the circumferential thickness of said tooth also being adjustable.

In order to ensure, during the actual profile-grinding part of the "formed wheel/generative" cycle, rotary drive connections between first, second and third ram slides 20, 21 and 22, necessary to impart profile-generating and helix-angle-generating rotation to the grinding wheel 24a and 24b, there are provided two sets of high precision radial spline couplings 53a/53b and 54a/54b respectively between ram slides 20 and 21 on the one hand and between ram slides 21 and 22 on the other; with coupling teeth 53a cut into ram slide 20, coupling teeth 53b cut into the upper face of a disc 60 keyed to ram slide 21, teeth 54a cut into the lower face of said disc 60, and teeth 54b cut into carrier frame 59. The teeth of these radial spline couplings are triangular in section and taperingly flat-flanked, as shown in FIG. 3, thus ensuring coaxial alignment of, and zero clearance drive-connections between, said first, second and third ram slides. Numbers of teeth in coupling sets 53a/53b and 54a/54b are as high as possible, but always differ by at least one tooth. Thus set 53a/53b may have 181 teeth of engagement height $h_1$, and set 54a/54b may then have 180 teeth of engagement height $h_2$, thereby enabling them to be used in the manner of a differential under the control respectively of actuating units 43 and 48 which in turn are respectively program-controlled through motors 42 and 49 from a precoded, external master program correlating all generative movements, be they grinding or non-grinding, in their correctly timed and correctly positional sequence.

During the actual flank-grinding part of a complete cycle of operation, spline coupling sets 53a/53b and 54a/54b are firmly engaged by spring means 62 and 63 interposed respectively between the lower face of piston 51 and the bottom of cylinder 56, and between the lower face of piston 52 and the bottom of cylinder 55. Simultaneously timed rotations of master wormwheel 18, driving ram slide 20 and "shaper cutter tooth" 24c formed by grinding wheel generatrices 24a and 24b, and master wormwheel 6, driving table 2 and workgear 4, in the correct gear ratio between the said two master wormwheels will, together with the reciprocation of ram slide 20 relative to outrigger slide 16, result in the grinding of one first complete involute helicoidal tooth flank pair on workgear 4.

As soon as grinding wheels 24a and 24b cease to make generative grinding contact with the workgear, hydraulic pressure is applied to the upper faces of pistons 51 and 52 to disengage spline couplings 53a/53b and 54a/54b against spring means 62 and 63. Immediately this disengagement has been completed and been "reported" to the master-program, motors 42 and 49 come into action under the control of said master-program, to bring grinding wheels 24a and 24b as quickly as technologically feasible into correct grinding engagement with a second workgear tooth gap, a certain predetermined number of pitches away from the first tooth gap, making the fullest possible use of the "differential" potential of spline couplings 53a/53b and 54a/54b. Thus it may be that, after grinding the first tooth gap, four workgear teeth are "jumped," then six after the grinding of the second tooth gap, then four, then five . . . and so on, in the optimum manner. When the correct relative positions are reached, spline couplings 53a/53b and 54a/54b are re-engaged, either together or sequentially, whereupon another flank-grinding cycle can begin. During the "jump" part of a complete grinding cycle the reciprocation of the first ram slide 20 need not be stopped.

As shown in FIG. 2, the spline couplings 53a/53b and 54a/54b are at the lower ends of the ram slides. A more convenient location for these couplings from an overall point of view is at the top ends of said ram slides. The respective coupling faces would be more accessible there and could, if so desired or found convenient for large batch production, be exchanged for other sets with different numbers of spline teeth. This arrangement is, in fact, the preferred arrangement for a gear grinding machine in accordance with the invention.

Since the axial grinding forces are small, especially if two grinding wheels as shown in FIG. 2 are used, the torques having to be transmitted through the aforementioned spline tooth couplings will also be small. It is, therefore, practicable to replace said spline tooth couplings 53a/53b and 54a/54b by precision-made cone or flat-faced friction clutches and control the angular positioning of ram slides 20, 21 and 22 relative to each other by differentially arranged optical or electrical gratings mounted on said ram slides in place of the spline tooth couplings, on top of the said ram slides, and use their outputs as a feed-back check on the instructions given to motors 42 and 49 by the precoded master program.

I claim:

1. A gear generating machine, for generating internal and external involute and non-involute gear teeth by the formed-wheel/generative process, having a substantial main machine bed at one end of which is located a power-driven continuously rotating work table, carrying secured thereto the workgear to be ground, and at the other end of which there is mounted a column or stanchion rectilinearly slidable and adjustable thereagainst for correct centre-distance setting between said table and said column; an outrigger slide, slidably adjustable along said column or stanchion in a direction parallel to the axis of rotation of said work table; a first cylindrical ram slide reciprocatably and rotatably supported in said outrigger slide, with a first means for adjustably reciprocating said first ram slide relative to said outrigger slide, a second adjustable means for simultaneously rotating said first ram slide relative to said outrigger slide and in timed relation with and proportional to the rotation of the rotating work table for the purpose of involute profile generation, and a third selectively adjustable means for superimposing on the aforementioned rotation of said first ram slide a further predetermined additive or subtractive rotation in timed relation with and proportional to the reciprocation of said first ram slide relative to said outrigger slide and due to the said first means, for the generative finishing of involute and non-involute helicoids; a second generally cylindrical ram slide reciprocatable and rotatably journalled within the first ram slide, means for reciprocating and rotating said second ram slide relative to said first ram slide in accordance with a first selectively predetermined program, and further means for drive-connecting rotationally in a program-determined relative angular position one to the other said second ram slide to said first ram slide; a third generally cylindrical ram slide reciprocatably and rotatably housed within the said second ram slide, means for reciprocating and rotating said third ram slide relative to said second and/or said first ram slide in accordance with a second predetermined program, and further means for drive-connecting rotationally in a program-determined relative angular position one to the other said third ram slide to said second ram slide; means for correlating said first predetermined program and said second predetermined program; and a grinding head unit mounted at the lower end nearest the work table of said third ram slide angularly adjustable thereagainst to any workgear helix angle within the range of the machine, and comprising at least one power-driven grinding spindle, a grinding wheel mounted thereon and rotatable therewith, and suitable means for form-dressing, form-truing and wear-compensating said grinding wheel in accordance with the workgear specification and the grinding parameters selected.

2. A gear generating machine as claimed in claim 1 wherein the means for generating helical involute and non-involute, external and internal gear teeth comprises, interposed between a first reciprocating ram slide and a journalled master wormwheel generatively rotating said first ram slide, a pair of opposite helical racks attached to and reciprocating with said first ram slide, a second pair of helical racks in driving mesh with said first pair of racks but constrained to reciprocate rectilinearly relative to the master wormwheel in a direction at right angles to the reciprocating motion of said first ram slide and first pair of helical racks relative to said master wormwheel, a third pair of helical racks each adjustably securable to each of the second pair of helical racks so that their respective pitch-planes are parallel to each other, a pair of externally toothed cylindrical gears journalled in the body of the master wormwheel and each respectively in mesh with a rack of the third pair of helical racks on the one hand and an internally toothed ring coaxially secured to the master wormwheel on the other, such that upon reciprocation of the first ram slide relative to the master wormwheel said ram slide is forced to rotate relative to said master wormwheel at a rate uniquely determined by the helix angle of the first and second pair of helical racks which are in simultaneous intermesh, and that further said relative rotation is made backlash-free by the racks of the third pair of helical racks each being rectilinearly preloaded against the corresponding rack of the second pair of helical racks.

3. A gear generating machine as claimed in claim 2 wherein the means for generating helical involute and non-involute gear teeth comprises a first pair of externally toothed cylindrical gears oppositely journalled in the body of the master wormwheel with each gear of said pair in mesh with one of the racks of the third pair of helical racks, a second pair of externally toothed cylindrical gears with each gear of said pair in mesh with the internally toothed ring coaxially secured to the master wormwheel, and a pair of change-gear sets each set of said pair drive-connecting one gear of the said first pair of gears to the opposite gear of the said second pair of gears, such that, by suitable selection of identical change-gears for each of the pair of change-gear sets, a wide range of helix angles may be catered for without changing the first and second pair of helical racks.

4. A gear generating machine as claimed in claim 1 wherein radial spline couplings are the means for drive-connecting a first, second and third ram slide rotatably and slidably mounted within each other and also the means for differentially positioning angularly said first, second and third ram slides relative to one another in accordance with a predetermined and suitably controlled cycle, and then re-establish drive-connections between them upon completion of said positioning.

5. A gear generating machine as claimed in claim 4 wherein the radial spline coupling components are secured respectively to a first, second and third ram slide at that end of each of said ram slides away from the grinding unit or head, and can be replaced by a different set of radial spline coupling components such that a wide range of differential positioning cycles for the angular positioning of said first, second and third ram slides relative to one another may be provided.

6. A gear generating machine as claimed in claim 1 wherein the angular positioning of the first, second and third ram slides relative to one another is controlled by a set of differentially acting optical or electrical gratings respectively secured to the upper ends of said first, second and third ram slides, and wherein said first, second and third ram slides are drive-connected after positioning by means of zero-shift flexible plate type clutches hydraulically, pneumatically or electrically actuated.

References Cited

UNITED STATES PATENTS

| 2,888,784 | 6/1959 | Cleff | 51—32 |
| 3,060,642 | 10/1962 | Cleff | 51—32 |
| 3,091,059 | 5/1963 | Cleff | 51—32 |
| 1,982,050 | 11/1934 | Gleason et al. | 51—32 |

JAMES L. JONES, Jr., Primary Examiner

U.S. Cl. X.R.

51—32